Patented May 18, 1937

2,080,832

UNITED STATES PATENT OFFICE 2,080,832

GLUE

George H. Osgood and Russell G. Peterson, Tacoma, Wash.

No Drawing. Application November 3, 1933, Serial No. 696,544

6 Claims. (Cl. 134—23.5)

We have discovered, through experiment, that an adhesive or cement for wood plies, such as veneer panels, can be made from the hulls of the coffee bean.

The adhesive produced is especially water-resistant and makes a panel that can be used either for interior or exterior work. The panels are not damaged by atmospheric conditions or moisture and, in tests, show pactically no weakening in the glue line after forty-eight hours of soaking in cold water or boiling for twelve hours. We believe that the adhesive properties are derived from the high hemi-cellulose content of the meal.

The cost of this material as a base for glue is much less than for other bases in common use at the present time, such as soya bean cake, peanut meal, casein, or blood albumen, while the glue made therefrom is comparable with any of them in strength while its water-resistance is much above the average. Its saving in cost to the user of glues is well over 25% of the cost of other water-resistant vegetable glues and is less than one-half the cost of casein or blood albumen.

The hulls of the coffee bean are known to the coffee trade as coffee parchment. In preparing this material for use it is first dried and then ground to a suitable mesh. We prefer to grind it to about 10 to 25 mesh.

A suitable solvent, or combination of chemicals, is added to the ground mass or flour to produce the adhesive. As solvents we use an alkali metal hydroxide, or its equivalent; these being salts of strong base with weak acids. We also use carbon bisulphide, or its equivalent; which would be any sulphur derivative of carbonic acid.

This ground flour, with an alkaline solvent, water, and carbon bisulphide produces a very satisfactory adhesive, but to shorten the time that it takes to set or dry out in the panel, we may add thereto a portion of zinc oxide or a clay in some form. This also materially increases its water-resistance.

Typical formulae are as follows:—

| | Parts |
|---|---|
| 1. Flour of coffee bean hulls | 1 |
| Water | 3 to 6 |
| Caustic soda | $\frac{1}{3}$– $1\frac{1}{4}$ |
| Carbon bisulphide | $\frac{1}{5}$– $\frac{3}{4}$ |

| | Parts |
|---|---|
| 2. Flour of coffee bean hulls | 1 |
| Water | 3 to 6 |
| Caustic potash | $\frac{1}{3}$– $1\frac{1}{4}$ |
| Sulphur derivative of carbonic acid | $\frac{1}{5}$– $\frac{3}{4}$ |
| China clay | $\frac{1}{10}$– $\frac{1}{4}$ |

| | Parts |
|---|---|
| 3. Flour of coffee bean hulls | 1 |
| Water | 3 to 6 |
| Caustic soda | $\frac{1}{3}$– $1\frac{1}{4}$ |
| Potassium xanthate | $\frac{1}{5}$– $\frac{3}{4}$ |
| Zinc oxide | $\frac{1}{10}$– $\frac{1}{4}$ |

The amount of caustic and carbon bisulphide can be varied within wide limits depending on the speed of reaction desired, the liquid life of the glue desired, and the water-resistance of the glue line.

In all these formulae the flour is added to the water and is stirred a few moments; the alkali metal hydroxide is then added and stirred; and then the carbon bisulphide is added and stirred. When this mixture becomes a smooth fluid of rather heavy consistency, the zinc oxide or clay is then added and the whole mass is then well stirred.

The adhesive thus produced can be applied to the wood by means of a brush or by a mechanical spreader.

It will be understood that the foregoing formulae are typical and that many variations may be made therein without departing from the spirit of our invention as defined by the following claims.

What we claim is:—

1. An adhesive composition comprising the flour of hulls of the coffee bean, with a suitable solvent, and water.

2. An adhesive composition comprising the flour of hulls of the coffee bean, as its adhesive base.

3. The method of making an adhesive composition which consists of including therein, as its adhesive base, the flour of the hulls of the coffee bean.

4. An adhesive composition which includes the flour of the hulls of the coffee bean, an alkaline metal hydroxide, and water.

5. An adhesive composition which includes the flour of the hulls of the coffee bean, an aqueous alkaline medium, and carbon bisulphide.

6. The process of making an adhesive composition which comprises the treating of the flour of the hulls of the coffee bean, with an aqueous alkaline medium, and a sulphur derivative of carbonic acid.

GEORGE H. OSGOOD.
RUSSELL G. PETERSON.